(12) United States Patent
Cremer

(10) Patent No.: US 12,252,994 B2
(45) Date of Patent: Mar. 18, 2025

(54) TURBINE ASSEMBLY

(71) Applicant: Hochschule Darmstadt, University of Applied Sci., Darmstadt (DE)

(72) Inventor: Michael Cremer, Bad Kreuznach (DE)

(73) Assignee: Hochschule Darmstadt, University of Applied Science (DE)

( * ) Notice: Subject to any disclaimer, the term of this patent is extended or adjusted under 35 U.S.C. 154(b) by 0 days.

(21) Appl. No.: 18/138,222

(22) Filed: Apr. 24, 2023

(65) Prior Publication Data

US 2023/0258099 A1    Aug. 17, 2023

Related U.S. Application Data

(63) Continuation of application No. PCT/IB2021/059975, filed on Oct. 28, 2021.

(30) Foreign Application Priority Data

Oct. 28, 2020    (DE) .................. 10 2020 128 334.2

(51) Int. Cl.
*F01D 15/10*    (2006.01)
*F02C 6/18*    (2006.01)

(52) U.S. Cl.
CPC .............. *F01D 15/10* (2013.01); *F02C 6/18* (2013.01); *F05D 2220/76* (2013.01)

(58) Field of Classification Search
CPC ........ F01D 15/10; F02C 6/18; F05D 2220/76; F01K 23/14; F01K 23/10
See application file for complete search history.

(56) References Cited

U.S. PATENT DOCUMENTS

| | | | | |
|---|---|---|---|---|
| 3,796,045 A | * | 3/1974 | Foster-Pegg | F02C 7/143 60/39.83 |
| 4,204,401 A | * | 5/1980 | Earnest | F02C 3/34 60/773 |
| 2016/0115826 A1 | * | 4/2016 | Eroglu | F01K 23/103 60/39.17 |

FOREIGN PATENT DOCUMENTS

ES    2387724 A1    9/2012

* cited by examiner

*Primary Examiner* — Joseph Ortega

(57) ABSTRACT

The present invention pertains a turbine arrangement comprising a compressor, a recuperator, a combustion chamber with the combustion air supply, a gas turbine, a heat exchanger, an expansion turbine for expanding the vaporized working medium, and wherein the compressor, the gas turbine and the expansion turbine are arranged on a common shaft which is connected to a generator for generating electrical energy.

19 Claims, 2 Drawing Sheets

TURBINE ASSEMBLY

BACKGROUND INFORMATION

Field of the Invention

The present invention relates to a turbine arrangement, a method of generating electrical power, and applications of the turbine arrangement.

Discussion of Prior Art

The energy supply of the future is to be efficient, low-emission and decentralized. Large power plants that use nuclear or fossil fuels will be replaced by many small and medium-sized plants (wind energy, photovoltaic, biogas, etc.) with favorable ecological balance. In the power grids, this creates a high volatility and thus a great need to ensure grid stability by means of flexible power plant systems and also energy storage. At the same time, the demand for electricity is increasing due to growing electromobility, which also leads to fluctuations and increases in consumption in the power grid.

The highest energy efficiency is achieved by large gas and steam power plants ("Combined Cycle Power Plants"), which consist of a combination of a gas turbine and a steam turbine. Gas turbines achieve an electric efficiency of around 40% here. The cost of electricity is essentially defined by the fuel costs Due to their principle, small gas turbines have a low electrical efficiency of approx. 30%—that is why they are mainly used in conjunction with heat processes. Their advantage lies in their multi-fuel capability and high robustness. Maintenance intervals are thus very long. Only when one or more small gas turbines are coupled with downstream processes for power generation, they achieve economically significant power generation costs, as far as fuel costs can be neglected. Electricity production using natural gas is only economically viable above an efficiency of ca. 40%.

Other systems (gas engines) are not suitable for a permanent energy supply, as they are very heavy and also require high maintenance effort. In relation to their size, these systems deliver only little power, i.e. they have an unfavorable power density.

Generic turbine arrangements are therefore considered as state of the art, in which either separate plants or large-scale plants are present, the latter with large distances to one another and purely stationary operation. In large-scale power plant systems these gas turbines are operated in such a way that either: a gas turbine (usually natural gas-fired) is directly coupled with a steam turbine or a gas turbine is coupled with one generator and a steam turbine with a second generator.

The reason why the first-described variant works under large-scale conditions is that the exhaust gas heat of the gas turbine is fed directly to the steam process of the downstream steam turbine. The steam turbine process works with intermediate superheating, with high-, medium- and low-pressure turbine stages expanding the steam to its condensation limit. The cycles combined in this way achieve high overall efficiencies in power generation of more than 60%.

Such processes cannot be scaled down at will, since at lower outputs the diameters of the turbine wheels have to become smaller, which leads to higher gap- and pressure losses. Likewise, the possibilities of cooling the turbine blades and the associated limit temperatures for the materials.

Small gas turbines compensate for this disadvantage by transferring exhaust heat to the compressed combustion air, which increases the potential efficiency of the turbine. In return this recuperation prevents the possible increase in efficiency by use of a downstream steam process as this process requires a superheating of the water (steam).

Combined systems consisting of a so-called "Organic Rankine Cycle" (ORC) and a micro gas turbine MGT (preferably in the power range of about 20 kW to 400 kW, which usually have a single-stage centrifugal compressor and a single-stage radial turbine) are described, among others, in U.S. Pat. No. 6,962,056 B2 and in the scientific study: "Analysis of Design and Part Load Performance of Micro Gas Turbine/Organic Rankine Cycle Combined Systems" by Joon Hee Lee and Tong Seop Kim, Journal of Mechanical Science and Technology, 2006.

In the latter publication, the authors concluded that a combined system consisting of the two processes leads to an efficiency of 39%. The authors always assume two mechanically decoupled processes. Specifically, a mechanical combination of an ORC turbine and a gas turbine is excluded, since the systems would mostly run at partial load during their lifetime.

BRIEF SUMMARY OF THE INVENTION

Based on the above-mentioned disadvantages of the prior art, the present invention is based on the task of providing a turbine arrangement and a method for generating electrical energy with which the disadvantages are overcome. In particular, a turbine arrangement is to be provided which is geometrically compact and highly integrated and can thus be used flexibly, while at the same time providing a high degree of efficiency is achieved with significantly reduced emissions, so that the turbine arrangement has a high power density.

This task is solved in a first aspect of the present invention by a turbine arrangement comprising
- a compressor (1) for sucking combustion air and compressing it into a combustion air supply (31),
- a recuperator (2) arranged in the combustion air supply (31) for applying heat energy to the combustion air,
- a combustion chamber (3) with the combustion air supply (31) arranged on the inlet side and a combustion gas exhaust (33) arranged on the outlet side,
- a gas turbine (4) which is connected on the inlet side to the fuel gas discharge (33) of the combustion chamber (3) and on the outlet side an exhaust gas discharge (43), the exhaust gas discharge (43) being guided through the recuperator (2),
- a heat exchanger (5, 21), which is thermally connected to the exhaust gas discharge (43), for applying exhaust gas heat to a vaporizable working medium,
- an expansion turbine (6), which has a working medium supply (61) on the inlet side, for expanding the vaporized working medium, the expanded working medium being discharged on the outlet side via a working medium discharge (63), wherein the compressor (1), the gas turbine (4) and the expansion turbine (6) are arranged on a common shaft (11) which is connected to a generator (12) for generating electrical energy.

The compressor used according to the invention is preferably a single-stage centrifugal compressor (in particular with a compression ratio of approx. 3 to 8).

The term "combustion air" is generally related to ambient air in the area of the turbine arrangement.

The term "recuperator" is used in the present invention to refer to that heat exchanger which uses exhaust gas energy to heat the compressed fresh air.

For the purposes of the present invention, the "combustion chamber" means the reaction chamber in which the heated and compressed combustion air is mixed with a fuel which reacts with the atmospheric oxygen (as far as technically possible) in a complete combustion process.

The gas turbine used in accordance with the invention is preferably a combination of a centrifugal (or Radial) compressor and expansion turbine with a combustion chamber (analogous to the systems on the market). The main difference to these known turbines is the complete integration of the Rankine Cycle, which is referred to as the "bottoming cycle". The entire system can also be described as a "Micro-Hybrid-Turbine" to represent the independence of the concept.

In the present invention, the term "heat exchanger" is used for the exhaust gas heat exchanger which transfers the residual energy of the process or unused residual energy of the exhaust gas to a working medium and vaporizes it. Additional heat sources can be coupled into this process.

The term "expansion turbine" is used to describe a single-stage radial turbine or single-stage axial turbine or a hybrid of both types. Multi-stage designs are optional for higher power outputs.

The "evaporable working medium" basically is characterized by its property of having a lower vaporization temperature than water. Such a fluid is usually a short-chain hydrocarbon (e.g. methanol, ethanol) or a fluorocarbon. Other media such as ammonia are also suitable, the essential factors here being the evaporation temperature and the enthalpy of evaporation.

Finally, the generator used according to the invention is preferably a high-speed generator, which is mounted on air bearings and/or magnetic bearings. The generator shaft is directly coupled to the turbine set/ORC turbine. The generator shaft is usually designed in such a way that magnets are shrunk onto the shaft or embedded in it and are reinforced by a jacket of steel or a high-strength fiber material.

The turbine arrangement according to the invention is technically in contrast to the above-mentioned publication by Lee et al., where a mechanical combination of an ORC turbine with a gas turbine is excluded, since the systems described there run mostly at partial load during their lifetime.

However, the turbine arrangement according to the invention circumvents the dilemma described above by Lee et al. in that a micro gas turbine, the gas turbine (4) according to the invention, is mechanically connected directly to an ORC turbine, referred to as an expansion turbine (6) according in the invention. The turbine arrangement according to the invention, it is thus able to transfer the waste heat from the gas turbine (4) to a low-boiling medium, in the present invention, the evaporable working medium, which in turn drives the expansion turbine (6).

Specifically, the mechanical coupling of the expansion turbine (6) and the gas turbine (4) enables a mutually complementary process for power generation. This process differs from large gas and steam power plants (outputs greater than 5 MW) in that the components are interconnected in such a way that first the recuperator (2) delivers combustion energy to the compressed fresh air and the remaining exhaust energy (usually more than 50% of the total fuel energy) is supplied via an integrated additional heat exchanger (5, 21) to a further process medium, namely the evaporable working medium. This combination in a turbine arrangement or in a process enables efficiencies significantly above existing microturbine systems.

Contrary to the teaching of Lee et al. as stated above, the turbine arrangement according to the invention is basically intended to be run as long as possible at full load under nominal conditions. For this reason, the turbine arrangement can therefore also be explained as a combination of both systems. Other positive effects occur, e.g. minimized bearing friction losses and the functional combination in a way that vacuum pressure from the compressor inlet can support the media supply (actually the required condensation) of the ORC-system (medium) or support the air bearing function.

Although the so-called combined heat and power (CHP) system often plays an important role in the consideration, electricity is a more valuable form of energy compared to heat because of its versatility. In the present invention, therefore the combustion energy is converted into electricity as far as possible. This is extremely useful in the context of economic considerations, since the cost of generating electricity can be drastically reduced in this way. The electricity generation costs are decisive for the economic viability and thus extend the range of application of a system or module according to the invention on many weak gas sources and low-calorific energy sources that are currently not economically viable. Thus, the system will significantly contribute to the reduction of climate-damaging gases (including methane and ammonia) from natural decomposition processes.

In other words, in technical terms, the present invention is the integration of an ORC process into a gas turbine process operating according to the Brayton Cycle—or the combination of the two aforementioned processes in one system.

The turbine arrangement according to the invention can be scaled in a power range between 20 kW and 400 kW.

In particular, the common shaft (11) may be a hollow shaft that allows the transport of a cooling medium. Furthermore, the expansion turbine (6) can be air-cooled.

Due to its high power density and modular design, the turbine arrangement according to the invention can be used for a wide range of applications.

The integration of external heat sources enables the use of residual heat from industrial processes and thus a reduction of CO2 emissions.

In a further development of the turbine arrangement according to the invention, the common shaft (11) of the compressor (1), gas turbine (4) and expansion turbine (6) is coupled to the generator (12) without a gearbox or mechanically decoupled. In particular, a magnetic coupling (13) can be used here. On the one hand, this special arrangement enables a vibrational decoupling of the generator (12) as well as gas turbine (4) and expansion turbine (6) and on the other hand a better redundancy.

A first embodiment of the present invention provides that the heat exchanger (5, 21) is arranged as a residual exhaust gas heat exchanger (5) downstream of the recuperator (2) in the exhaust gas discharge (43). This design enables easy coupling and adaptation to corresponding power requirements or other boundary conditions.

A second embodiment alternative to the first embodiment provides that the heat exchanger (5, 21) is arranged as exhaust gas heat exchanger (21) in combination with the recuperator (2) in the exhaust gas discharge (43). With this arrangement, the compact design is decisive, here the design changes from a counterflow to a cross-flow heat exchanger.

In the second embodiment, it may be advantageous if the compressor (1) is designed to generate a negative pressure, for which purpose the compressor (1) is arranged downstream of the combustion chamber (3) and the gas turbine (4). With this embodiment, the turbine arrangement according to the invention is operated according to the so-called "inverted Brayton cycle", whereby the compressor (1) generates a negative pressure in the combustion chamber (3) across the recuperator (2)/ORC heat exchanger (21) and the expansion turbine (6) and thus generates the combustion gases, which in turn are expanded in the expansion turbine (6). Subsequently, the combustion gases are cooled down in the recuperator (2)/ORC heat exchanger (21) until entering the compressor (1) on the suction side. The combustion heat given off in the heat exchanger (21) can then be fed back to combustion via a heating coil and/or to an ORC process via an evaporator.

The exhaust side of the expansion turbine (6) can be evacuated to increase efficiency and to safeguard the process. Substances escaping from the process (e.g.: condensate, air and aerosols contained therein, evaporable working medium) can thus be discharged via the combustion process.

In addition or alternatively to this further development, the generator (12) and a housing surrounding the common shaft (11) can be designed to be evacuated. Thus, the air friction of the shaft (11) is reduced, furthermore a cooling effect for the generator (12) is created since according to the general gas equation [p=r*R*T] the temperature is pressure-dependent.

In order to increase the variability of the turbine arrangement according to the invention, in addition to the heat exchanger (5, 21), external heat sources (99) can be thermally coupled in. These external heat (99) sources can be industrial waste heat processes, solar heat.

For the efficiency of the present invention, it has been found to be important if the working medium is fed starting from the heat exchanger (5, 21) via the expansion turbine (6), a working medium condenser (7), a condensate feed pump (8), a working medium reservoir (9) and a working medium feed pump (10) back into the heat exchanger (5, 21) in a circuit. The working medium is to be fed back to the heat exchanger (5, 21) with as little effort as possible for its conditioning (prevention of contamination or decay) for a long time in operation and to be consumed in minimal quantities in order to reduce the maintenance effort.

Preferred working fluids are low-boiling alcohols, low-boiling hydrocarbons or halogenated hydrocarbons. Particularly preferred are acetone, methanol, ethanol or so-called refrigerants such as pentafluoro-propane, but mixtures of ethanol with water or ammonia and water are also conceivable. Due to the low boiling point and the nevertheless high evaporation (condensation) enthalpy, these substances enable a higher energy yield than the classic gas and steam process.

Whenever process features are mentioned in the description of the turbine arrangement according to the invention, they refer in particular to the process according to the invention. Likewise, features mentioned in the description of the process according to the invention refer to the turbine arrangement according to the invention.

The explanations above relate also to a second aspect of the present invention by generation of electric power under use of the turbine arrangement, applying the following steps:
a) drawing in combustion air and compressing it by means of a compressor (1) into a combustion air supply (31),
b) applying thermal energy to the combustion air by means of a recuperator (2) arranged in the combustion air supply (31),
c) introducing the heated combustion air into a combustion chamber (3) via the combustion air supply (31),
d) discharging combustion gas from the combustion chamber (3) via a combustion gas discharge (33),
e) introducing the fuel gas into a gas turbine (4) and discharging the exhaust gas via an exhaust gas discharge (43), wherein the exhaust gas discharge (43) is guided through the recuperator (2),
f) applying exhaust gas heat of the exhaust gas in a heat exchanger (5, 21), to an evaporable working medium, wherein the heat exchanger (5, 21) being in thermal communication with the exhaust gas discharge (43), and introducing the vaporizable working medium into an expansion turbine (6),
g) expanding the vaporizable working medium in an expansion turbine (6), wherein the expanded working medium is discharged on the outlet side via a working medium discharge (63),
h) driving a generator (12) for generating electrical energy with the mechanical energy of at least the expansion turbine (6).

The process basically shows the advantages already indicated above in connection with the turbine arrangement.

As fuels for the process according to the invention and the turbine arrangement various types of natural gas, biogases, organic fuels or synthetic fuels can be applied.

The process according to the invention also has the advantage that the waste heat from the gas turbine (4) can be transferred to the vaporizable working medium, which in turn drives the expansion turbine (6). More specifically, this means that the mechanical coupling of the expansion turbine (6) and the gas turbine (4) create a mutually complementary process for power generation.

In a third aspect of the present invention, the foregoing problem is solved by using the Turbine arrangement as described above The turbine arrangement according to the present invention can first be used as a stationary system for power generation and residual heat utilization from renewable and/or industrial and/or synthetic and/or conventional energy sources. Renewable energy sources preferably include biogas, lean gases and landfill gases.

A further use lies in the interconnection of several turbine arrangements described above to form stationary clusters or virtual power plants.

The turbine arrangement according to the invention can furthermore serve as a mobile system for at least temporarily powering vehicles. The turbine arrangement according to the invention covers at least the average energy demand of the respective vehicle, while the load peaks of the energy demand are covered together with and/or by means of an electricity storage system.

Finally, the turbine arrangement according to the invention can be used as a mobile system for power generation.

Further objectives, features, advantages and possible applications result from the following description of embodiments not limiting the invention on the basis of the figures. Thereby, all described and/or pictorially depicted features in themselves or in any combination form the subject matter of the invention, also independently of their summary in the claims or in the figures. of their summary in the claims or their relation back.

DETAILED DESCRIPTION OF THE INVENTION

Figure 1:
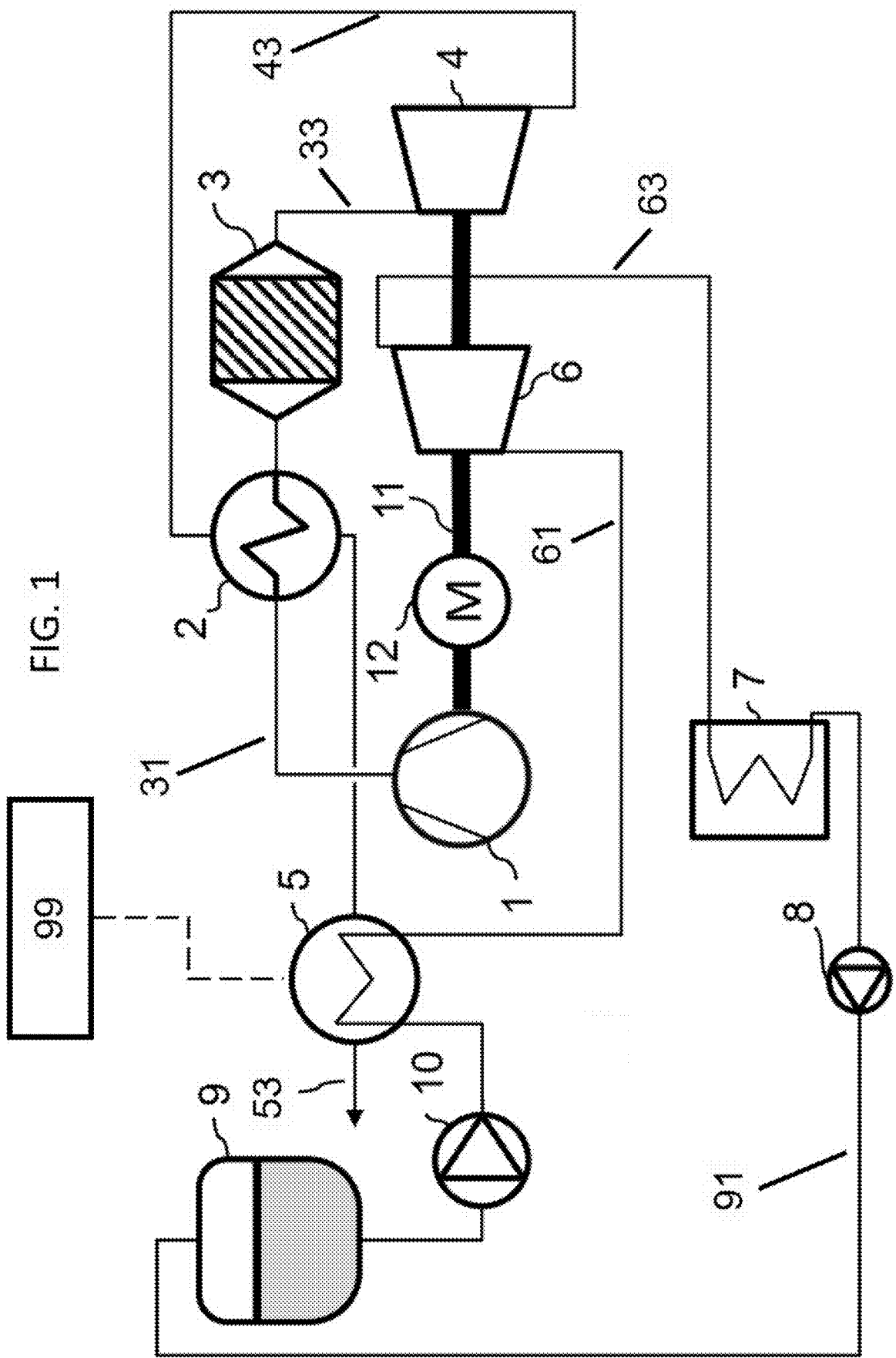
FIG. 1 a schematic representation of the turbine arrangement according to the invention according to a first embodiment of the invention and FIG. 2 a schematic representation of the turbine arrangement according to the invention according to a second embodiment of the invention.

FIG. 1 shows a compressor 1 (compressor) which draws in ambient air and compresses it. The air thus processed is fed via a line 31 (combustion air supply) to a heat exchanger designed as a recuperator 2. In this recuperator 2, the compressed air is heated, the heat energy coming from the exhaust gas from the combustion. After leaving the recuperator 2, the air is fed to a combustion chamber 3 where it is mixed with fuel and burned. From there, the resulting hot exhaust gas is fed via a line 33 (fuel gas discharge, at the same time fuel gas supply to the turbine) to the expansion turbine 4 (gas turbine). In the expansion turbine 4, the exhaust gas is expanded, whereby it releases a portion of its energy. The exhaust gas streams via the exhaust manifold 43 (exhaust gas removal) into the recuperator 2. There, the exhaust gas releases heat energy to the compressed fresh air and then enters the heat exchanger 5, which is designed as a superheater or ORC evaporator.

In heat exchanger 5, a large part of the remaining exhaust gas energy is transferred to a working medium (so-called ORC medium). Subsequently, the exhaust gas expands into the environment 53.

The ORC medium is conveyed from the storage tank 9 by means of a fluid feed pump 10 to the heat exchanger 5 (superheater), where it is heated and finally evaporates and then enters the expansion turbine 6 via the pipeline 61 (working medium feed). After flowing through the expansion turbine 6, the ORC medium is fed via another pipeline 63 (working medium discharge) into the condenser 7, where it condenses and is then returned in liquid form to the storage tank 9 via the condensate feed pump 8 and the return line 91.

Figure 2:
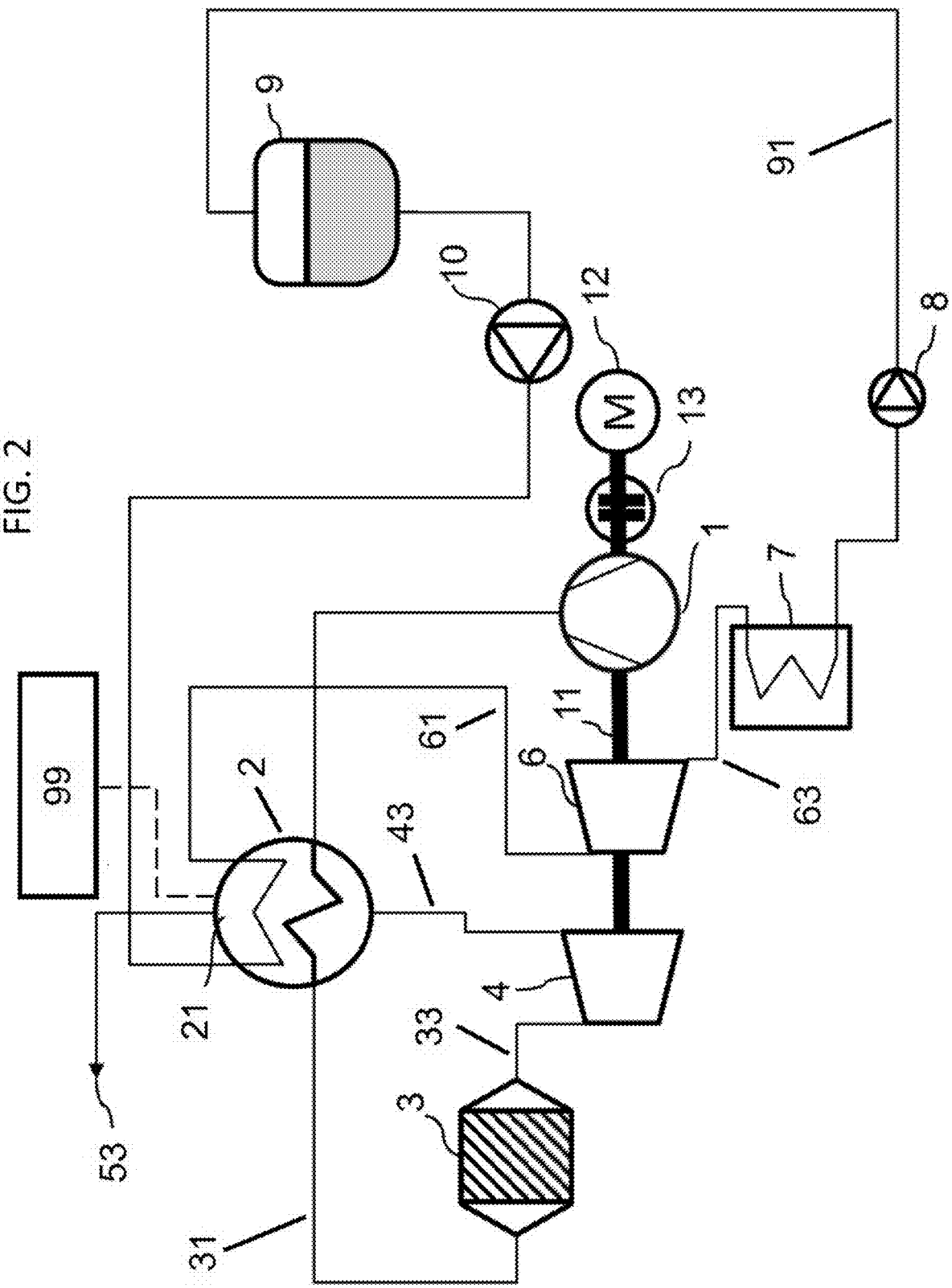

FIG. 2 shows a variation of the setup shown in FIG. 1 in such a way that compressor 1, expansion turbine 6 and gas turbine 4 are arranged coupled on a shaft 11 and these are connected to a generator 12 by means of a vibration decoupling device 13 to a generator 12. The vibration decoupling device 13 may be a separate module (e.g. a magnetic coupling) or optionally, e.g. a flexible part of the overall shaft (vibration damper). In this way critical bending vibrations of the shaft are damped.

The function of the variation shown in FIG. 2 is identical to the configuration shown in FIG. 1. In addition to the arrangement of the expansion turbine (6) and the generator 12 on the shaft 11, the special distinguishing feature is the hybrid heat exchanger 21 (combined heat exchanger—exhaust gas/fresh air ORC evaporator), through which the exhaust gas flows after leaving the gas turbine 4 through the pipe 43 in the direction of the exhaust gas outlet 53. In this heat exchanger 21, the fresh air from compressor 1 is first heated via line 31 and then enters combustion chamber 3. In a step parallel to this, the ORC medium is superheated in the same heat exchanger 21 in a downstream process so that it flows into the expansion turbine 6 via the pipe 61.

Under normal operating conditions, all material flows are to be conveyed continuously and with constant quantities at the design point through the systems in order to achieve high electrical efficiency.

The fields of application of the present invention result from the good scalability and the option to use a wide variety of fuels efficiently. As a decentralized system or in the form of interconnected systems (coupling of several systems), the turbine arrangement according to the invention can cover a wide range of applications. As a so-called stand-alone solution, the turbine arrangement according to the invention can supply smaller settlements completely or supplementarily with electricity, and as a combination of several turbine arrangements according to the invention, a virtual power plant can be set up with power output very precisely matched to the energy demand. For this purpose, a network of any number of turbine arrangements according to the invention can be interconnected and thus efficiently replace larger power plants. The use of biogas from agriculture, urban waste water management, natural or industrial processes or mine gases, also the use of so-called weak gases, ammonia, alcohols or synthetic fuels enables sustainable energy generation Further advantages arise here indirectly from the reduction of the nitrogen concentration in agricultural waste and the associated reduction of the nitrate content in soils and groundwater through the utilization of ammonia from agricultural waste products. Hydrogen, synthesis gases or natural gas from fossil sources can be converted to electricity with the turbine arrangement according to the invention and thus efficiently compensate for fluctuations in the energy supply from regenerative sources in a decentralized manner. This reduces investment costs in large power grids.

Use of the turbine arrangement according to the invention in mobile applications is applicable and desirable, especially in vehicles with a high peak load requirement and a low total load (waste disposal vehicles), but also in agricultural systems or in local public transport appears to be a sensible application. Vehicles designed for long-distance operation are a possible application.

Functionally, the use of a sub-atmospherically operating turbine according to the Brayton cycle is a possible variation. In this case, the turbine is modified according to the operating principle shown in FIG. 2 in such a way that the compressor 1 generates a vacuum which draws in fresh gas through the combustion chamber 3. The fresh gas is thereby drawn "backwards" through the combustion chamber 3 and gas turbine 4 and only then enters the inlet of the compressor 1 through the heat exchanger 5, 21.

According to the invention, the turbine arrangement combines the power production of a gas turbine 4 with a steam turbine on a shaft 11 in such a way that the heat energy in the exhaust gas available after the exhaust gases passes the gas turbine 4 is made available to a recuperator 2 for preheating combustion air and to a heat exchanger 5, 21 for evaporating a vaporizable working medium. The heat energy is divided between both process media in such a way that optimum efficiency is achieved for the overall system. Energy from combustion is fed back into the gas turbine process to increase the efficiency of this sub process. The working medium to be evaporated is to be heated with the remaining energy to such an extent that it is expanded in an expansion turbine (6) (also pulse turbine or reaction turbine) with a high pressure ratio.

Ideally, the process medium is a so-called ORC (Organic Rankine Cycle)—medium, i.e. an aliphatic alcohol such as ethanol or methanol; acetone or various refrigerants (R134a etc.) are also suitable. The use of water as an evaporable working medium may be considered. The Organic Rankine Process describes the classic steam turbine process using a (mostly) organic medium that usually evaporates at temperatures lower than water. In this way, energy from low-calorific sources can still be utilized with corresponding efficiency.

The system components of an embodiment according to the invention are coupled with each other in a modular manner and can be adapted or exchanged at any time for maintenance work or adaptation to changed environmental conditions. The modular design of the system is specific and thus part of the invention In an advantageous embodiment of this arrangement, the combustion air is already compressed to such an extent that recuperation is not necessary or is only necessary to a small extent, so that the combustion energy can be largely made available to the downstream steam process to further increase the overall efficiency of the system. It is relevant here that high compression can be achieved by multiple compression or by a high-compression radial stage, but then massive overlaps with conventional gas turbines are to be considered.

Ideally, compressor 1 and gas turbine 4 are designed as radial runners and are single-stage. A multistage arrangement of these components is a possible adaption for higher power outputs. The expansion turbine 6 for the steam or ORC process, which is also single-stage, is mounted centrally between the two systems or optionally between generator 12 and gas turbine 4.

The bearing arrangement of a system according to the invention should preferably be designed by means of air bearings; further bearing options are magnetic bearings or plain bearings.

Various systems can be used as combustion chambers 3 in order to burn the fuels with low emissions according to their quality and composition. The relevant technologies include the so-called FLOX burners ("Flameless Oxidation") and pore burners, which are mainly designed using metal oxide ceramic materials.

According to the invention, the gas turbine 4 and generator 12 are to be cooled by means of water; cooling by means of ethanol or a water-ethanol mixture is to be aimed at. Part of the cooling capacity is provided by the air volume exiting the air bearings in the direction of the shaft 11 and gas turbine 4. If possible, the turbine shaft 11 should be hollow in order to achieve a high torsional rigidity of the gas turbine 4; in addition, the hollow shaft can transport cooling media.

Furthermore, the extraction of bleed air after the compressor 1 or from an additional compressor for process control is possible. This additional compressor can be arranged on the turbine shaft.

Due to the combination of two circuits, the energy flows, mass flows and the disturbance variables must be controlled in such a way that the two circuits work synchronously and their performances add up. For this, the technical demands on materials, control, regulation and operationally safe design of the components under all conditions are enormous.

The ORC turbine requires very tight tolerances to avoid leakage of the working fluid and thus loss of power. Leakage at the expansion turbine 6 leads to significant malfunctions and failure of the turbine arrangement according to the turbine arrangement is likely.

In a particular embodiment of the present invention, as described above, the compressor 1 is designed to generate a negative pressure. Here, combustion and residual heat utilization are enabled according to the principle of the inverted Brayton cycle process.

This inverted Brayton cycle process is a modification of the Brayton (or Joule)—process in that here the compressor 1 draws combustion air "backwards" through the gas turbine 4 and an intermediate heat exchanger 5, 21. Thus, in the direction of flow of the working medium, the turbine is located upstream of the heat exchanger 5, 21 and the compressor 1. This arrangement can be derived from the turbine arrangement described in accordance with the invention by simple modification. Similarly, the efficiency in this process conversion can be increased by a mechanically directly coupled ORC process in accordance with the invention.

The turbine arrangement according to the invention has a sophisticated system of bearings and media guides that achieve efficient thermal decoupling of the gas turbine 4 and the expansion turbine 6 from one another. Suitable cooling media and cooling media routing in combination with a selection of materials that meet the thermal and mechanical requirements of the system ensure that the individual components support each other to a large extent during operation and that both overheating of one process and inefficient cooling of the other are ruled out.

The subsystems are designed with respect to each other to run in their optimum efficiency range or to work together to produce the optimum efficiency of the system.

According to the invention, the gas turbine 4 and the expansion turbine 6 are synchronized. In other words, it is essential that gas turbine 4 and expansion turbine 6 complement each other in their outputs, which is essentially done by designing at full load point such that the energy delivered in ORC heat exchanger 21 and the resulting mass flow, pressure and temperature of the working fluid extract just enough energy from the exhaust gas of the gas turbine process that this results in equal speeds in both turbines 4, 6.

LIST OF REFERENCE SIGNS

1 compressor
2 recuperator
21 heat exchanger
3 combustion chamber
31 combustion air supply
33 combustion gas exhaust
4 gas turbine
43 exhaust gas discharge
5 heat exchanger (ORC evaporator—superheater)
6 expansion turbine (impulse turbine)
61 working medium feed (steam feed)
63 working medium discharge (steam return)
7 working medium condenser (capacitor)
8 condensate feed pump
9 working medium reservoir
10 working medium feed pump
11 common shaft
12 generator
13 coupling element

The invention claimed is:

1. A turbine arrangement comprising
a compressor for sucking combustion air and compressing it into a combustion air supply,
a recuperator arranged in the combustion air supply for applying heat energy to the combustion air,
a combustion chamber having a combustion chamber inlet side and a combustion chamber outlet side, with the combustion air supply arranged on the combustion chamber inlet side and a combustion gas exhaust arranged on the combustion chamber outlet side for discharging combustion exhaust,
a gas turbine which is connected on a gas turbine inlet side to the combustion gas exhaust of the combustion chamber and on a gas turbine outlet side an exhaust gas discharge that discharges exhaust gas, the exhaust gas discharge being guided through the recuperator, a heat exchanger, which is thermally connected to the exhaust gas discharge, for applying heat from the exhaust gas to a working medium, the working medium being vaporizable, an expansion turbine, which has a working medium supply on an expansion turbine inlet side, for expanding the working medium to create an expanded working medium, the expanded working medium being discharged on an expansion turbine outlet side via a working medium discharge, wherein the compressor, the gas turbine and the expansion turbine are arranged on a common shaft which is connected to a generator for generating electrical energy.

2. The turbine arrangement according to claim 1, wherein the common shaft of compressor, gas turbine and expansion turbine is coupled to the generator in a gearless or mechanically decoupled manner.

3. The turbine arrangement according to claim 1, wherein the heat exchanger is arranged as a residual exhaust gas heat exchanger downstream of the recuperator in the exhaust gas discharge.

4. The turbine arrangement according to claim 1, wherein the heat exchanger is arranged as an exhaust gas heat exchanger in combination with the recuperator is arranged in the exhaust gas discharge.

5. The turbine arrangement according to claim 1, wherein the compressor is adapted to generate a negative pressure, for which purpose the compressor is arranged downstream of the combustion chamber and the gas turbine.

6. The turbine arrangement according to claim 1, wherein, in addition to the heat exchanger, one or more external heat sources are thermally coupled in.

7. The turbine arrangement according to claim 1, wherein the working medium, starting from the heat exchanger via the expansion turbine, a working medium condenser, a condensate feed pump, a working medium reservoir and a working medium feed pump back into the heat exchanger is led.

8. The turbine arrangement according to claim 1, wherein a low-boiling alcohol, a low-boiling hydrocarbon or a halogenated hydrocarbon can be used as the working medium.

9. A method of generating electric power using the turbine arrangement according to claim 1, comprising the steps of
a) drawing in combustion air and compressing it by means of a compressor into the combustion air supply,
b) applying thermal energy to the combustion air by means of the recuperator arranged in the combustion air supply,
c) introducing the heated combustion air into the combustion chamber via the combustion air supply,
d) discharging combustion gas from the combustion chamber via the combustion gas discharge,
e) introducing the combustion gas discharge into a gas turbine and discharging exhaust gas via the exhaust gas discharge, wherein the exhaust gas is guided through the recuperator,
f) applying exhaust gas heat of the exhaust gas in a heat exchanger, to a vaporizable working medium, wherein the heat exchanger being in thermal communication with the exhaust gas discharge, and introducing the vaporizable working medium into an expansion turbine,
g) expanding the vaporizable working medium in an expansion turbine, wherein the expanded working medium is discharged on the outlet side via a working medium discharge,
h) driving a generator for generating electrical energy with the mechanical energy of at least the expansion turbine.

10. The turbine arrangement according to claim 1, wherein the arrangement of the components is either
compressor (1), generator (12), expansion turbine (6), gas turbine (4)
or
gas turbine (4), expansion turbine (6), compressor (1), generator (12) is designed.

11. A turbine arrangement comprising
a compressor (1) for sucking combustion air and compressing it into a combustion air supply (31),
a recuperator (2) arranged in the combustion air supply (31) for applying heat energy to the combustion air,
a combustion chamber (3) having a combustion chamber inlet side and a combustion chamber outlet side, with the combustion air supply (31) arranged on the combustion chamber inlet side and a combustion gas exhaust (33) arranged on the combustion chamber outlet side for discharging combustion exhaust,
a gas turbine (4) which is connected on a gas turbine inlet side to the fuel gas discharge (33) of the combustion chamber (3) and on a gas turbine outlet side an exhaust gas discharge (43) that discharges exhaust gas,
the exhaust gas discharge (43) being guided through the recuperator (2),
a heat exchanger (5, 21), which is thermally connected to the exhaust gas discharge (43), for applying heat from the exhaust gas to a working medium that is vaporizable,
an expansion turbine (6), which has a working medium supply (61) on an expansion turbine inlet side, for expanding the working medium to create an expanded working medium, the expanded working medium being discharged on an expansion turbine outlet side via a working medium discharge (63),
wherein the compressor (1), the gas turbine (4) and the expansion turbine (6) are arranged on a common shaft (11) which is connected to a generator (12) for generating electrical energy,
wherein the working medium, starting from the heat exchanger (5, 21) via the expansion turbine (6), a working medium condenser (7), a condensate feed pump (8), a working medium reservoir (9) and a working medium feed pump (10) back into the heat exchanger (5, 21) in a circuit is led.

12. The turbine arrangement according to claim 11, wherein the arrangement of the components is either
compressor (1), generator (12), expansion turbine (6), gas turbine (4)
or
gas turbine (4), expansion turbine (6), compressor (1), generator (12) is designed.

13. The turbine arrangement according to claim 11, wherein the common shaft (11) of compressor (1), gas turbine (4) and expansion turbine (6) is coupled to the generator (12) in a gearless or mechanically decoupled manner.

14. The turbine arrangement according to claim 11, wherein the heat exchanger (5, 21) is arranged as a residual exhaust gas heat exchanger (5) downstream of the recuperator (2) in the exhaust gas discharge (43).

15. The turbine arrangement according to claim 11, wherein the heat exchanger (5,21) is arranged as an exhaust gas heat exchanger (21) in combination with the recuperator (2) is arranged in the exhaust gas discharge (43).

16. The turbine arrangement according to claim 11, wherein the compressor (1) is adapted to generate a negative pressure, for which purpose the compressor (1) is arranged downstream of the combustion chamber (3) and the gas turbine (4).

17. The turbine arrangement according to claim 11, wherein, in addition to the heat exchanger (5, 21), one or more external heat sources are thermally coupled in.

18. The turbine arrangement according to claim 11, wherein a low-boiling alcohol, a low-boiling hydrocarbon or a halogenated hydrocarbon can be used as the working medium.

19. A method of generating electric power using a turbine arrangement according to claim 11, comprising the steps of
  a) drawing in combustion air and compressing it by means of the compressor (1) into the combustion air supply (31),
  b) applying thermal energy to the combustion air by means of the recuperator (2) arranged in the combustion air supply (31),
  c) introducing the heated combustion air into the combustion chamber (3) via the combustion air supply (31),
  d) discharging combustion gas from the combustion chamber (3) via the combustion gas discharge (33),
  e) introducing the combustion gas into the gas turbine (4) and discharging the exhaust gas via the exhaust gas discharge (43), wherein the exhaust gas discharge (43) is guided through the recuperator (2),
  f) applying exhaust gas heat of the exhaust gas in the heat exchanger (5, 21), to the vaporizable working medium, wherein the heat exchanger (5, 21) being in thermal communication with the exhaust gas discharge (43), and introducing the vaporizable working medium into the expansion turbine (6),
  g) expanding the vaporizable working medium in the expansion turbine (6), wherein the expanded working medium is discharged on the outlet side via the working medium discharge (63),
  h) driving the generator (12) for generating electrical energy with the mechanical energy of at least the expansion turbine (6).

* * * * *